United States Patent
Lambrecht et al.

(10) Patent No.: US 6,876,166 B2
(45) Date of Patent: Apr. 5, 2005

(54) ELECTRIC-MOTOR DRIVE

(75) Inventors: Heinz Lambrecht, Lübbecke (DE); Ralf Bokämper, Lübbecke (DE)

(73) Assignee: Dewert Antriebs-und Systemtechnik GmbH & Co. KG, Kirchlengern (DE)

( * ) Notice: Subject to any disclaimer, the term of this patent is extended or adjusted under 35 U.S.C. 154(b) by 65 days.

(21) Appl. No.: 09/979,015

(22) PCT Filed: Mar. 15, 2001

(86) PCT No.: PCT/EP01/02885
§ 371 (c)(1),
(2), (4) Date: Nov. 15, 2001

(87) PCT Pub. No.: WO01/71875
PCT Pub. Date: Sep. 27, 2001

(65) Prior Publication Data
US 2002/0158594 A1 Oct. 31, 2002

(30) Foreign Application Priority Data
Mar. 20, 2000 (DE) ...................... 200 05 054 U

(51) Int. Cl.$^7$ .............. H02P 1/00; G05B 9/02; H02H 7/08; H01H 43/00
(52) U.S. Cl. ............ 318/445; 318/563; 318/452; 318/453; 307/326; 307/141; 361/23; 361/28; 361/115
(58) Field of Search ................ 318/563, 445, 318/446, 453, 478, 487, 490, 778, 782, 452, 484, 567, 565, 564; 361/23, 28, 51, 115, 1; 307/326, 652, 141, 125

(56) References Cited

U.S. PATENT DOCUMENTS

| | | | | |
|---|---|---|---|---|
| 4,056,762 A | * | 11/1977 | Schadlich ............... 318/484 |
| 4,114,077 A | * | 9/1978 | Oates et al. ............. 318/473 |
| 4,115,859 A | * | 9/1978 | Brisk et al. ............. 700/165 |
| 4,319,298 A | * | 3/1982 | Davis et al. ............. 361/24 |
| 4,345,327 A | * | 8/1982 | Thuy ..................... 714/797 |
| 4,484,127 A | * | 11/1984 | Salihi et al. ............. 318/802 |
| 4,730,164 A | * | 3/1988 | Daido et al. ............. 324/545 |
| 4,733,148 A | * | 3/1988 | Rodi ..................... 318/490 |
| 4,817,045 A | * | 3/1989 | Faeser ................... 700/293 |
| 5,416,399 A | * | 5/1995 | Brunson ................. 318/778 |
| 5,450,001 A |   | 9/1995 | Konstanzer |
| 5,467,002 A | * | 11/1995 | Brooks .................. 318/553 |
| 5,534,782 A | * | 7/1996 | Nourse .................. 324/500 |
| 5,587,640 A | * | 12/1996 | Ek et al. ................ 318/638 |
| 5,601,178 A | * | 2/1997 | Zaharia et al. ........... 198/323 |
| 5,726,887 A | * | 3/1998 | Spies et al. ............. 701/29 |
| 5,789,887 A | * | 8/1998 | Elischewski ............. 318/468 |
| 5,818,195 A | * | 10/1998 | Frick et al. ............. 318/771 |
| 5,923,145 A | * | 7/1999 | Reichard et al. .......... 318/811 |
| 5,925,998 A | * | 7/1999 | Olson .................... 318/484 |

(Continued)

FOREIGN PATENT DOCUMENTS

| | | | | |
|---|---|---|---|---|
| DE | 4132208 | 9/1991 | | |
| DE | 19717743 | 4/1997 | | |
| EP | 261541 | 9/1987 | | |
| JP | 06133578 A | * | 5/1994 | ............ H02P/5/00 |

*Primary Examiner*—David Martin
*Assistant Examiner*—Patrick Miller
(74) *Attorney, Agent, or Firm*—Barnes & Thornburg LLP

(57) ABSTRACT

An operational check of the safety unit or the safety circuit takes place within the delay time of the relay, assigned to each motor, caused by the pick-up delay or the release delay. Also, the control unit can be equipped such with at least one safety component and/or safety circuit for controlling the control unit that an operational check of the control unit takes place between the operation of an operating element of the hand switch and the starting of the motor or motors. The operating time and the release time of the relay may be delayed by a suitable component so that sufficient time is available for the operational check.

3 Claims, 1 Drawing Sheet

U.S. PATENT DOCUMENTS

| | | | | |
|---|---|---|---|---|
| 6,121,746 A | * | 9/2000 | Fisher et al. | 318/772 |
| 6,150,782 A | * | 11/2000 | Breitling et al. | 318/434 |
| 6,184,795 B1 | * | 2/2001 | Johnson | 340/648 |
| 6,218,951 B1 | * | 4/2001 | Colvin | 340/635 |
| 6,225,768 B1 | * | 5/2001 | Cookson et al. | 318/280 |
| 6,278,910 B1 | * | 8/2001 | Miura et al. | 700/297 |
| 6,392,318 B1 | * | 5/2002 | Griffis | 307/125 |
| 6,456,034 B1 | * | 9/2002 | Vilou | 318/811 |
| 6,456,195 B1 | * | 9/2002 | Berndt et al. | 340/468 |
| 2001/0020836 A1 | * | 9/2001 | Joch | 318/434 |
| 2003/0050735 A1 | * | 3/2003 | Griffs | 700/255 |

* cited by examiner

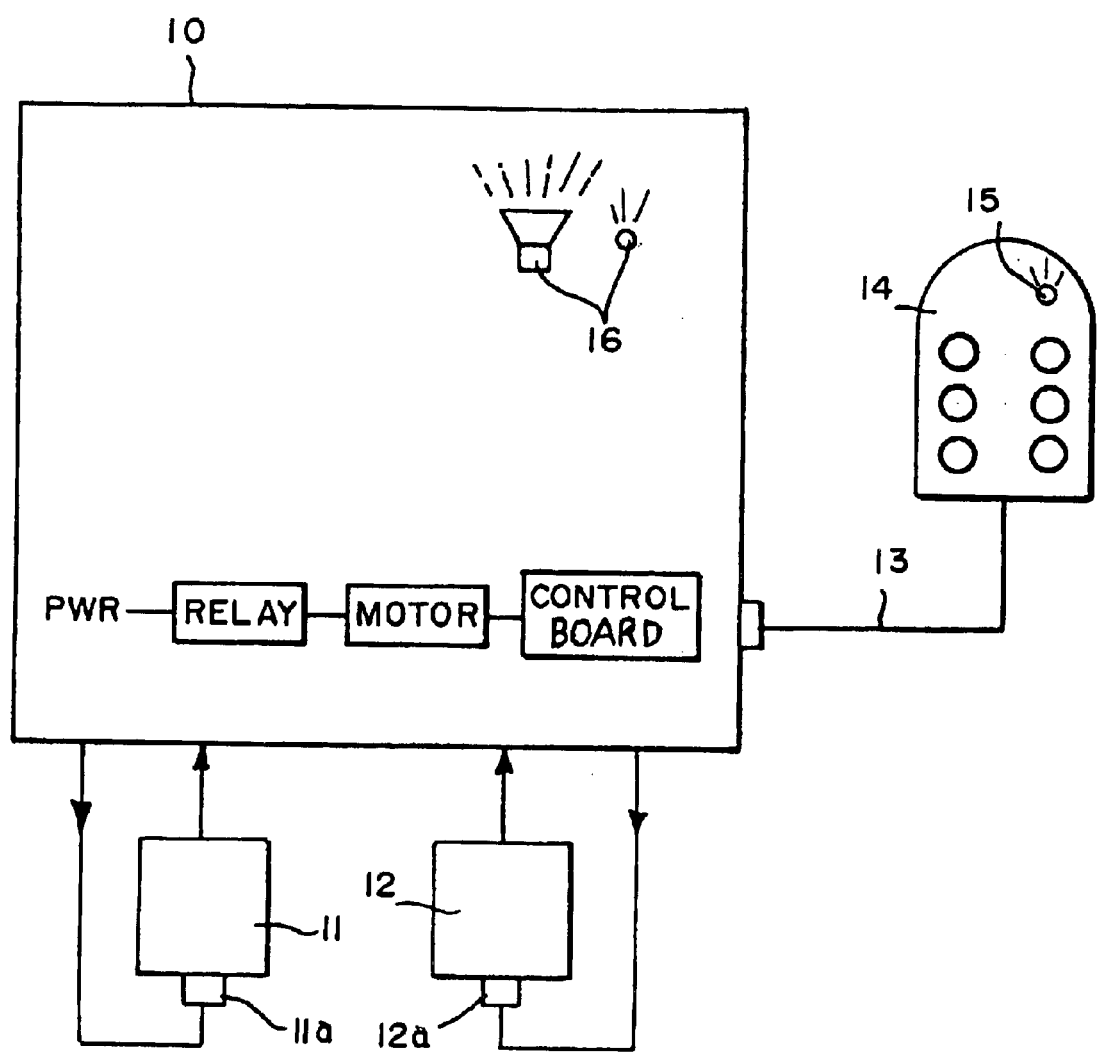

ELECTRIC-MOTOR DRIVE

BACKGROUND AND SUMMARY OF THE INVENTION

The invention relates to an electric-motor drive, particularly a furniture drive, having a control unit, which can be operated by a hand switch and contains a control board, as well as having a safety unit or a safety circuit.

The suitable electric-motor drive is known in many construction. The respective construction depends on the usage. Drives are known which have a driving motor and an output element as well as so-called double drives with two driving motors and two output elements. For use in the furniture field, the appropriate drives are linear drives. By way of a step-down gear, the motor drives a spindle on which a spindle nut is non-rotatably disposed which carries a lifting tube or similar component which can be connected to the component to be adjusted.

Since the drives are used in households and in the medical field as well as in the care-giving field, high safety demands are made corresponding to a standard.

According to the above-mentioned standard for electrical devices, a so-called first-fault safety is demanded. For example, if a function is not triggered for a switching-off, it must nevertheless be ensured that the switch-off operation is carried out, or that, for example, the drive cannot be switched on when faults or defects are present on electrical or electronic components. It is an object of the invention to design an electric-motor drive of the initially mentioned type such that the first-fault safety demanded by the electric appliances standard is met so that an operator or user is not in any danger when, as a result of a failure or a defect of an electric or electronic component, a required switching operation can no longer be triggered, or so that, in the event of a failure of an electric or electronic component, the electric-motor drive cannot be started.

The above-mentioned object is achieved according to a first embodiment in that an operational check of the safety unit or of the safety circuit takes place within the time caused by the slow operation or slow release of the relay assigned to each motor.

According to a second embodiment the control unit is equipped such with at least one safety component and/or safety circuit for controlling the control unit that an operational check of the control unit takes place between the operation of a operating element of a hand switch and the starting of the motor or motors. As a result of the designs according to the invention, the control unit controls itself so that a failure or a defect of electric or electronic components is immediately detected. Thus, the function can, for example, be switched off when the contacts of a relay no longer release. Thus, for example, as a result of a comparison, a release can take place to all motors when the prerequisites exist for the start. In the event of a fault report, all motors are switched off when the fault signal blocks a release switching element, preferably a transistor of the switching logic. If the function is ensured, this can take place, for example, by the lighting up of a visual display element, preferably a luminous diode in the hand switch or at an easily visible site. This visual display element should then preferably radiate as long as the operating element is pressed.

In a further development, it is provided that the control unit is equipped with several safety components or several safety circuits into which the fault signals can be fed. In this case, each safety component or safety circuit is designed for very specific fault signals. So that the user is immediately informed of a fault report, it is provided that a visual and/or an acoustic signal is generated.

The bridging time is relatively brief so that the fault report is also brief (acoustically and/or visually). The disappearance is an indication that the testing operation has been concluded. The brief fault report occurs because, after an operation of an operating element and before the pick-up of the assigned relay and the then starting motor as well as after the release of the operating element and before the opening of the assigned relay and the subsequently idle motor, a defined time interval passes, in which a fault condition has been met which. However, after the expiration of this time interval, is no longer met in the normal case. The resulting fault report, which occurs for a short time and then disappears, may be considered to be a kind of operational check.

In certain cases, this time interval may be so brief that the acoustic and visual reporting devices are too slow because of their own signal processing run times for indicating a recognizable signal. For receiving a discernable acoustic and/or visual signal, by suitable devices, an extension of the operating time and of the releasing time of the motor relay is simulated such that the reporting device emits the above-described signal for the control during a time period which is sufficient for human perception. It is therefore provided that, by a delay element, preferably the operating time of the relay assigned to each motor can be extended. However, in a further development, it is provided that the operating time and the releasing time of the relay assigned to each motor will be extended. This delay element is preferably arranged in the control, the fault signal processing or in the reporting device. However, it may also be arranged at a different location.

Other objects, aspects and novel features of the present invention will become apparent from the following detailed description of the invention when considered in conjunction with the accompanying drawings.

BRIEF DESCRIPTION OF THE DRAWINGS

FIG. 1 is a block diagram of the control unit of an electric-motor device according to the invention.

In the illustrated embodiment, the control unit 10 containing a control board is equipped with two safety components 11, 12 which may also be circuits which are provided in the control board of the control unit 10. The control unit 10 is connected with a hand switch 14 by way of a control cable 13. The transmission of the signals triggered by the hand switch 14 may also take place in a wireless manner. When one of the operating elements of the hand switch 14 is operated, the safety components are first activated preferably within the delay time of the relays assigned to the motors, in order to test the operational reliability. In the event of a fault or of several faults, the signals are fed into the inputs 11a or 12a of the safety components 11, 12, so that, for example, a starting of the motors is prevented.

As illustrated in the FIGURE, the hand switch 14 may be equipped with a visual display in the form of a luminous diode 15 which, in the event of a fault, radiates as long as the corresponding operating element of the hand switch 14 is pressed. Furthermore, a visual or acoustic display element 16 may also be installed in the control unit 10. Corresponding to the FIGURE, a visual and an acoustic display element can be used. However, it is also possible to use only one of the two display elements.

In a manner not shown in detail, a delay element may be used at an appropriate point, expediently in the control or the fault signal processing or in the reporting device in order to extend, for example, the operating time and the releasing time of the relay assigned to each motor, so that the operational check can also be carried out during this time.

The invention is not limited to the illustrated embodiment The analogous self-control of the control unit is the significant requirement for ensuring the first-fault safety.

What is claimed is:

1. An electric-motor drive comprising a control unit and at least one motor, and the control unit being operated by a bend switch and containing a control board and at least one safety component having a relay, and the control unit further comprising: means for performing an operational check of the at least one safety component during the relay's delay time, the delay time being caused by the pick-up delay or release of the relay; and the at least one safety component being equipped for receiving predetermined different fault signals.

2. The electric-motor drive according to claim 1 including a reporting device that in the event of a fault report, a visual and/or acoustic signal is generated.

3. The electric-motor drive according to claim 1, wherein an operating time and the release time of the relay assigned to each of the at least one motor can be extended.

* * * * *